United States Patent [19]
Aitken et al.

[11] Patent Number: 5,179,045
[45] Date of Patent: Jan. 12, 1993

[54] COLORED GLASS-CERAMIC

[75] Inventors: Bruce G. Aitken, Erwin; Robert W. Pfitzenmaier, Canisteo; Charles C. Smith, Jr., Corning, all of N.Y.

[73] Assignee: Corning Incorporated, Corning, N.Y.

[21] Appl. No.: 753,316

[22] Filed: Aug. 30, 1991

[51] Int. Cl.$^5$ .............................. C03C 10/14
[52] U.S. Cl. ................................. 501/4; 501/69
[58] Field of Search .................. 501/4, 68, 69

[56] References Cited

U.S. PATENT DOCUMENTS

| | | | |
|---|---|---|---|
| 3,252,811 | 5/1966 | Beall | 501/4 |
| 3,788,865 | 1/1974 | Babcock et al. | 501/7 |
| 4,007,048 | 2/1977 | Sack et al. | 501/4 |
| 4,009,042 | 2/1977 | Rittler | 501/4 |
| 4,018,612 | 4/1977 | Chyung | 501/4 |
| 4,084,974 | 4/1978 | Beall et al. | 501/4 |
| 4,093,468 | 6/1978 | Boitel et al. | 501/4 |
| 4,192,688 | 3/1980 | Babcock et al. | 501/7 |
| 4,507,392 | 3/1985 | Rittler | 501/4 |
| 4,526,872 | 7/1985 | Andrieu et al. | 501/4 |
| 4,835,121 | 5/1989 | Shibuya et al. | 501/4 |
| 4,940,674 | 7/1990 | Beall et al. | 501/61 X |

*Primary Examiner*—Karl Group
*Attorney, Agent, or Firm*—Milton M. Peterson; Clinton S. Janes, Jr.

[57] ABSTRACT

A transparent glass-ceramic and an article of cookware formed therefrom. The glass-ceramic has as its primary crystal phase a beta-quartz solid solution, contains an amount of $TiO_2$ effective as a nucleating agent up to about 6%, and has a color package composed of 50 to 150 ppm $Co_3O_4$, 50 to 250 ppm $NiO$ and 400 to 1000 ppm $Fe_2O_3$ that provides a burgundy color.

12 Claims, 2 Drawing Sheets

COLORED GLASS-CERAMIC

FIELD OF THE INVENTION

The field is transparent, beta-quartz glass-ceramics having a specific coloration and infra-red transmission.

BACKGROUND OF THE INVENTION

Glass-ceramic materials are crystalline or semi-crystalline materials produced from precursor glasses by in situ crystallization. The crystallization process initially requires a glass that contains one or more nucleating agents that permit a controlled crystallization process. A variety of nucleating agents have been disclosed in the prior art. The most commonly used nucleating agent is titania ($TiO_2$) alone, or in conjunction with zirconia ($ZrO_2$).

$ZrO_2$ may be used alone as a nucleating agent for a transparent, beta-quartz solid solution glass-ceramic. This is disclosed, for example, in U.S. Pat. No. 3,252,811 (Beall). However, it is difficult to incorporate $ZrO_2$ into a glass melt, requiring high melting temperatures and/or long melting times.

The next step is heat treatment of a suitably selected glass in accordance with a controlled time-temperature schedule. Usually, the heat treatment occurs in two stages. In the first stage, crystal nuclei are formed in the glass. This is followed by a second stage during which crystals grow on the nuclei. The heat treatment may occur in conjunction with cooling and forming of a molten glass. Alternatively, a glass article may be formed and cooled, and subsequently heat treated to cause crystallization.

In situ crystallization of glasses in the $Li_2O$-$Al_2O_3$-$SiO_2$ composition field generally provides highly crystallized glass-ceramics. The primary crystal phase, depending on glass composition and heat treatment, may be a transparent beta-quartz solid solution, or a beta-spodumene solid solution.

Beta-quartz is the hexagonal trapezohedral modification of $SiO_2$. It exhibits a slightly negative coefficient of thermal expansion (CTE). This makes it of particular interest where thermal cycling occurs, as in cookware. The basis of the beta-quartz solid solution is believed to be the substitution of $Al^{+3}$ ions for some of the $Si^{+4}$ ions in the beta-quartz structure. The attendant charge deficiency is made up by the introduction of a small ion, such as $Li^+$, $Mg^{+2}$, or $Zn^{+2}$, into the beta-quartz structure.

Beta-quartz solid solution glass-ceramics customarily contain $TiO_2$ as a nucleating agent. Optionally, the $TiO_2$ may be partially, or wholly, substituted for by $ZrO_2$ as explained earlier. The appearance of such glass-ceramics can be varied by varying composition and/or heat treatment. Thus, transparent, translucent, or opaque glass-ceramics, which may be water-white, translucent, opaque white, or variously colored, are all possibilities as described in the prior art.

The widest use of $Li_2O$-$Al_2O_3$-$SiO_2$ glass-ceramic materials has been in the field of culinary ware. For over three decades, Corning Glass Works, now Corning Incorporated, has marketed opaque white cooking utensils under the trademark CORNING WARE. More recently, cooking utensils, formed from a transparent glass-ceramic exhibiting a light brown tint, were introduced commercially by Corning France, S.A. under the the trademark VISION. In general, this transparent glass-ceramic is crystallized at lower temperatures to develop small, beta-quartz solid solution crystals. Such glass-ceramics and their production are described, for example, in U.S. Pat. Nos. 4,018,612 and No. 4,526,872.

It has been observed that transparent, beta-quartz glass-ceramics nucleated with $TiO_2$ tend to exhibit a light brown tint. This is ascribed to the presence of both $TiO_2$ and $Fe_2O_3$ in the parent glass composition. Efforts have, therefore, been made to either develop a decolorizer or to mask the tint. In an opaque, white glass-ceramic, the brown tint is effectively masked.

Masking, however, becomes more difficult in transparent glass-ceramics. Thus, U.S. Pat. No. 4,093,468 (Boitel et al.) describes problems encountered when attempts were made to mask the brown tint in transparent glass-ceramics. Accordingly, that patent proposed neodymium oxide as a composition additive to make the glass-ceramic sensibly colorless.

The present invention arises from a desire to achieve a decorative color in a transparent, beta-quartz solid solution glass-ceramic. This goes beyond simply neutralizing the inherent brown tint.

In addition to achieving the desired coloration, production demands that it be done while maintaining a certain degree of infra-red transmission in the molten glass. This is necessary to adequately retain heat in the glass during the forming process. Heretofore, this has been accomplished by maintaining the $Fe_2O_3$ level in the composition at a small, but reasonably critical, amount.

SUMMARY OF THE INVENTION

The glass-ceramic material of our invention is a transparent glass-ceramic having a beta-quartz solid solution as its primary crystal phase, containing an amount of $TiO_2$ effective as a nucleating agent up to about 6%, and having a color package composed of 50 to 150 ppm $Co_3O_4$, 50 to 250 ppm NiO and 400 to 1000 ppm $Fe_2O_3$, thereby providing a burgundy color. The chromaticity color coordinates (Illuminant C) provided by the color package fall within the ranges x = 0.3220 to 0.3410
y = 0.2990 to 0.3220
Cap Y = 50–70

A preferred embodiment has a color package composed of about 100 ppm $Co_3O_4$, about 200 ppm NiO and about 650 ppm $Fe_2O_3$.

Our invention further resides in an article of cookware composed of a transparent glass-ceramic material as just described.

PRIOR ART

In addition to the patents already noted, attention is directed to the following United States patents:

Several patents, such as U.S. Pat. No. 3,788,865 (Babcock et al.), No. 4,009,042 (Rittler) and No. 4,018,612 (Chyung) disclose use of transition metal oxides, including NiO, $Cr_2O_3$, $Fe_2O_3$, MnO, $Co_3O_4$ and $V_2O_5$ as colorants for transparent glass-ceramics.

U.S. Pat. No. 4,007,048 (Sack et al.) discloses a $Li_2O$-$Al_2O_3$-$SiO_2$ glass-ceramic containing $TiO_2$, MnO, $Fe_2O_3$, CoO and NiO to produce a black color that appears red by transmitted light in a stove top.

U.S. Pat. No. 4,192,688 (Babcock et al.), a division of No. 3,788,865, discloses $Li_2O$-$Al_2O_3$-$SiO_2$ glass-ceramics containing a variety of different oxide glass colorants, individually or in combination. The color in the glass-ceramic differs from that in the precursor glass, and may vary in the glass-ceramic depending on the heat treatment.

U.S. Pat. No. 4,461,839 (Rittler) discloses transparent, translucent, or opaque glass-ceramics that have a beta-quartz crystal phase. They exhibit colors varying from black to brown to red and contain 0.05–0.2% $Fe_2O_3$, 2.5–6% $TiO_2$ and 0.3–3% of at least two oxides selected from 0–2% CaO, 0–3% $CeO_2$, 0–1% NiO, 0–1.5% $SnO_2$, 0–0.3% $V_2O_5$ and 0–1% $WO_3$.

U.S. Pat. No. 4,526,872 (Andrieu et al.) discloses a $TiO_2$-nucleated, beta-quartz glass-ceramic having a light brown tint supplied by $Fe_2O_3$, CoO and $Cr_2O_3$ with $MnO_2$ and $V_2O_5$ optional.

U.S. Pat. No. 4,835,121 (Shibuya et al.) discloses $V_2O_5$ as an additive in a beta-quartz glass-ceramic to enhance infrared transmittance. The patent excludes other colorants, such as $Fe_2O_3$, MnO, NiO, CoO, $Cr_2O_3$ and $CeO_2$, because they reduce infra-red transmittance.

U.S. Pat. No. 4,940,674 (Beall et al.) adds 25–250 ppm $Cr_2O_3$ to a beta-quartz glass-ceramic to reduce haze. $Co_3O_4$ and $Fe_2O_3$ are then added to provide a neutral color.

Pending application S.N. 07/603,407 (Amundson et al.) discloses a color package to provide a light beige color in a potassium fluorrichterite glass-ceramic. The package includes 0.065–0.16% $Fe_2O_3$, 0.055–0.16% NiO, 0.0015–0.0029% Se and 0–0.0014% $Co_3O_4$, the latter controlling brightness if present.

DESCRIPTION OF THE INVENTION

The present invention is based on discovery of a color package. This color package provides a specified burgundy color in a transparent glass-ceramic having a beta-quartz solid solution as its primary crystal phase. The art is familiar with production of the basic glass-ceramic material. Numerous examples of compositions are set forth in such U.S. Pat. Nos. as 4,018,612 (Chyung), 4,093,468 (Boitel et al.) and 4,526,872 (Andrieu et al.) noted earlier.

The present invention, being concerned with a color package, is generally applicable to beta-quartz solid solution glass-ceramics. In general, that glass-ceramic family is composed essentially of, as calculated from precursor glass batches in percent by weight on an oxide basis,

| $SiO_2$ | 48–70 | $Li_2O$ | 2.5–5 |
|---|---|---|---|
| $Al_2O_3$ | 17.5–30 | $ZrO_2$ | 0–4 |
| MgO | 1–2.5 | $TiO_2$ | 1.8–6.0 |
| BaO | 0–2 | $As_2O_3$ | 0–1 |
| ZnO | 0–6 | $P_2O_5$ | 0–12 |

Visual appearance of a color is, of course, controlling from a consumer viewpoint. A color tint thus selected must then be defined for production control. For this purpose, the standard CIE system, employing chromaticity coordinates x and y and the tri-stimulus value Y, has been adopted.

Chromaticity values are measured under standard conditions, i.e., Illuminant C, with a Hunter Colorimeter. They are a measure of light diffusely reflected off opaque surfaces. Because the values obtained are readily reproducible, they are commonly employed to facilitate comparisons and to establish specification limits.

Consumer surveys, conducted among cookware users, indicated a strong preference for a burgundy color, that is, a purple color with a reddish cast. The problem then was to achieve this desired color in a transparent glass-ceramic having as its primary crystal phase a beta-quartz solid solution.

Initially, it was recognized that any color obtained in the precursor glass would not be retained in the crystallized, glass-ceramic state. Further, it was necessary to work within the confines of two other requirements. First, the glass composition would contain, as a nucleating agent, titania ($TiO_2$), whereby a brown tint would be imparted to the resulting glass-ceramic. Second, the iron oxide ($Fe_2O_3$) would range from at least 400 ppm up to about 1000 ppm. This assures adequate infra-red radiation control to facilitate heat retention in the glass melt during the forming process.

Working within these limitations, we explored the coloring effects obtainable by adding known glass colorants to the precursor glass batch. These were added, either alone or in combinations. The resulting glass was then crystallized to the glass-ceramic state. These melting expeditions led us to the discovery that a combination of nickel and cobalt oxide additions, together with the necessary $TiO_2$ and $Fe_2O_3$ contents, could yield the desired burgundy color.

Figure 1:
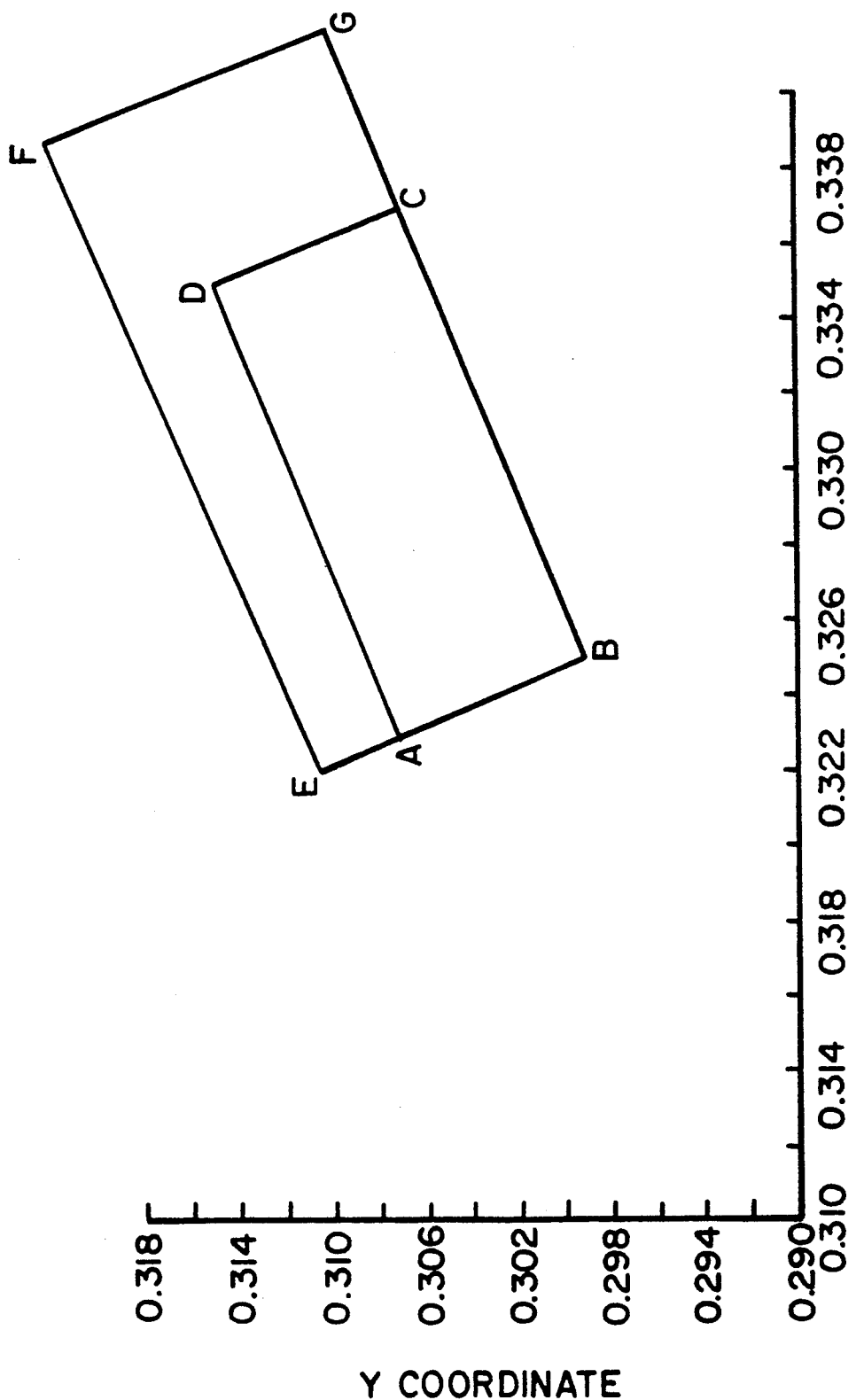
FIG. 1 in the drawing is a graphical representation of chromaticity coordinates x and y (Illuminant C). Rectangle BEFGB encompasses chromaticity coordinates for materials in accordance with the invention.

In the accompanying drawing, FIG. 1 is a graphical representation of our color package employing the CIE chromaticity coordinate system. In FIG. 1, x coordinates are plotted on the horizontal axis and y coordinates are plotted on the vertical axis. The rectangle BEFGB encompasses coordinate value combinations that provide generally acceptable burgundy colors in accordance with the invention. The color coordinate value ranges for this area are:

x=0.3220 to 0.3410
y=0.2990 to 0.3220

The smaller rectangle ABCDA encompasses coordinate value combinations that represent the target area for the desired burgundy color for a cooking vessel. The color coordinate value ranges for this target area are:

x=0.3230 to 0.3370
y=0.2990 to 0.3150

A survey of our experimental data indicates certain trends that occur as the contents of the colorants NiO, $Co_3O_4$ and $Fe_2O_3$ are individually increased, or decreased, in a beta-quartz solid solution glass-ceramic. These trends are shown by vectors in FIG. 2, where, as in FIG. 1, x coordinate values are plotted on the horizontal axis and y values on the vertical axis.

The NiO vector indicates that increasing the NiO content increases the x coordinate value, while effecting little or no change in the y values. Increasing the $Co_3O_4$ content markedly decreases y coordinate values while having a much lesser effect on x values. Increasing the $Fe_2O_3$ content tends to increase the x and y coordinate values about equally.

Satisfactory burgundy colors may be obtained with combinations of colorants which individually fall within the following ranges:

| NiO | 50 to 250 ppm |
|---|---|
| $Co_3O_4$ | 50 to 150 ppm |
| $Fe_2O_3$ | 400 to 1000 ppm |

The colorants are, of course, employed in conjunction with up to about 6% $TiO_2$ as a nucleating agent. A particularly preferred embodiment is a combination of 200 ppm NiO, 100 ppm $Co_3O_4$ and 650 ppm $Fe_2O_3$.

SPECIFIC EMBODIMENTS

The invention is further described with reference to experiments carried out in the course of its development. A commercially tested glass-ceramic, having a beta-quartz solid solution as its primary crystal phase, was selected as a base composition. The precursor glass for this glass-ceramic has the following calculated composition in percent by weight on an oxide basis:

| $SiO_2$ | 68.2 | BaO | 0.75 |
|---|---|---|---|
| $Al_2O_3$ | 19.2 | $TiO_2$ | 2.7 |
| $Li_2O$ | 2.8 | $ZrO_2$ | 1.75 |
| MgO | 1.8 | $As_2O_3$ | 0.9 |
| ZnO | 1.0 | | |

The precursor glass has a coefficient of thermal expansion (0°-300° C.) of $33 \times 10^{-7}$/°C.; a softening point of 960° C.; a strain point of 655° C.; a liquidus of 1250° C.; and a viscosity at the liquidus of 35,000 poises.

Using the foregoing glass as a base, numerous experimental batches were formulated. These used known colorants in varying amounts, both individually and in combination. The batches were melted in silica crucibles at a temperature of 1600° C. for 24 hours. The melts were poured onto steel plates to produce glass slabs. These slabs were immediately annealed at 650° C. to 700° C., and then crystallized using a two stage heat treatment. Initially, the slabs were heated at 750° C. to 800° C. for one hour to form nuclei. Then, the temperature was raised to 880° C. to 900° C. for one hour to crystallize the glass by forming a beta-quartz solid solution crystal phase.

In this manner, it was determined that the desired burgundy color could be obtained in a $TiO_2$-nucleated glass-ceramic with a combination of nickel, cobalt and iron oxides. The next step was to make a number of melting excursions at different colorant levels. These excursions determined combinations that would provide color coordinates falling within the prescribed boundaries as defined by rectangle BEFGB in FIG. 1 of the drawing. These excursions were made at three levels of $Fe_2O_3$, namely, 450, 680 and 910 ppm. At each level, a composition grid was established with NiO being varied over a range at several levels of $Co_3O_4$. These grids were designed to produce color coordinate combinations both within and without the indicated area of FIG. 1.

TABLE I, below, sets forth numerous satisfactory colorant combinations together with the x and y chromaticity coordinate and tri-stimulus values for each combination. Colorant contents are in parts per million (ppm).

TABLE I

| Ex. | $Co_3O_4$ | NiO | $Fe_2O_3$ | x | y | Y |
|---|---|---|---|---|---|---|
| 1 | 60 | 170 | 450 | 0.3284 | 0.3138 | 66.4 |
| 2 | 60 | 250 | 450 | 0.3328 | 0.3133 | 62.5 |
| 3 | 80 | 170 | 450 | 0.3275 | 0.3091 | 63.7 |
| 4 | 80 | 210 | 450 | 0.3302 | 0.3090 | 61.5 |
| 5 | 80 | 250 | 450 | 0.3321 | 0.3089 | 59.8 |
| 6 | 80 | 80 | 680 | 0.3276 | 0.3127 | 65.3 |
| 7 | 80 | 170 | 680 | 0.3300 | 0.3109 | 62.0 |
| 8 | 80 | 210 | 680 | 0.3344 | 0.3127 | 60.6 |
| 9 | 100 | 210 | 680 | 0.3319 | 0.3068 | 58.6 |
| 10 | 100 | 50 | 680 | 0.3230 | 0.3074 | 65.2 |
| 11 | 100 | 90 | 680 | 0.3235 | 0.3057 | 63.5 |
| 12 | 100 | 130 | 680 | 0.3262 | 0.3053 | 61.4 |
| 13 | 100 | 170 | 680 | 0.3307 | 0.3077 | 58.9 |
| 14 | 120 | 90 | 680 | 0.3266 | 0.3055 | 60.8 |
| 15 | 120 | 130 | 680 | 0.3267 | 0.3033 | 59.5 |
| 16 | 120 | 170 | 680 | 0.3312 | 0.3051 | 57.2 |
| 17 | 140 | 130 | 680 | 0.3257 | 0.2996 | 57.5 |
| 18 | 100 | 50 | 910 | 0.3288 | 0.3131 | 64.4 |
| 19 | 100 | 130 | 910 | 0.3295 | 0.3098 | 61.5 |
| 20 | 120 | 50 | 910 | 0.3270 | 0.3058 | 60.7 |
| 21 | 120 | 90 | 910 | 0.3299 | 0.3106 | 61.1 |
| 22 | 120 | 130 | 910 | 0.3332 | 0.3098 | 58.3 |
| 23 | 140 | 50 | 910 | 0.3245 | 0.3024 | 60.3 |
| 24 | 140 | 90 | 910 | 0.3271 | 0.3026 | 58.1 |
| 25 | 140 | 130 | 910 | 0.3292 | 0.3025 | 56.6 |

TABLE II, below, sets forth a number of colorant combinations that do not provide the desired burgundy color, that is, they do not fall within the BEFGB rectangle of FIG. 1. As in TABLE I, chromaticity coordinate and tri-stimulus values are included and colorant contents are stated in ppm.

TABLE II

| Ex. | $Co_3O_4$ | NiO | $Fe_2O_3$ | x | y | Y |
|---|---|---|---|---|---|---|
| 26 | 40 | 170 | 450 | 0.3284 | 0.3174 | 69.0 |
| 27 | 40 | 130 | 450 | 0.3264 | 0.3172 | 69.6 |
| 28 | 40 | 90 | 450 | 0.3244 | 0.3173 | 70.1 |
| 29 | 120 | 50 | 680 | 0.3200 | 0.3004 | 62.9 |
| 30 | 140 | 50 | 680 | 0.3226 | 0.3014 | 61.0 |
| 31 | 140 | 90 | 680 | 0.3234 | 0.2990 | 58.8 |
| 32 | 60 | 50 | 680 | 0.3248 | 0.3167 | 71.7 |
| 33 | 60 | 170 | 680 | 0.3315 | 0.3188 | 67.1 |
| 34 | 100 | 0 | 910 | 0.3238 | 0.3114 | 67.6 |
| 35 | 120 | 0 | 910 | 0.3221 | 0.3061 | 65.2 |
| 36 | 140 | 0 | 910 | 0.3214 | 0.3031 | 62.8 |

Figure 2:
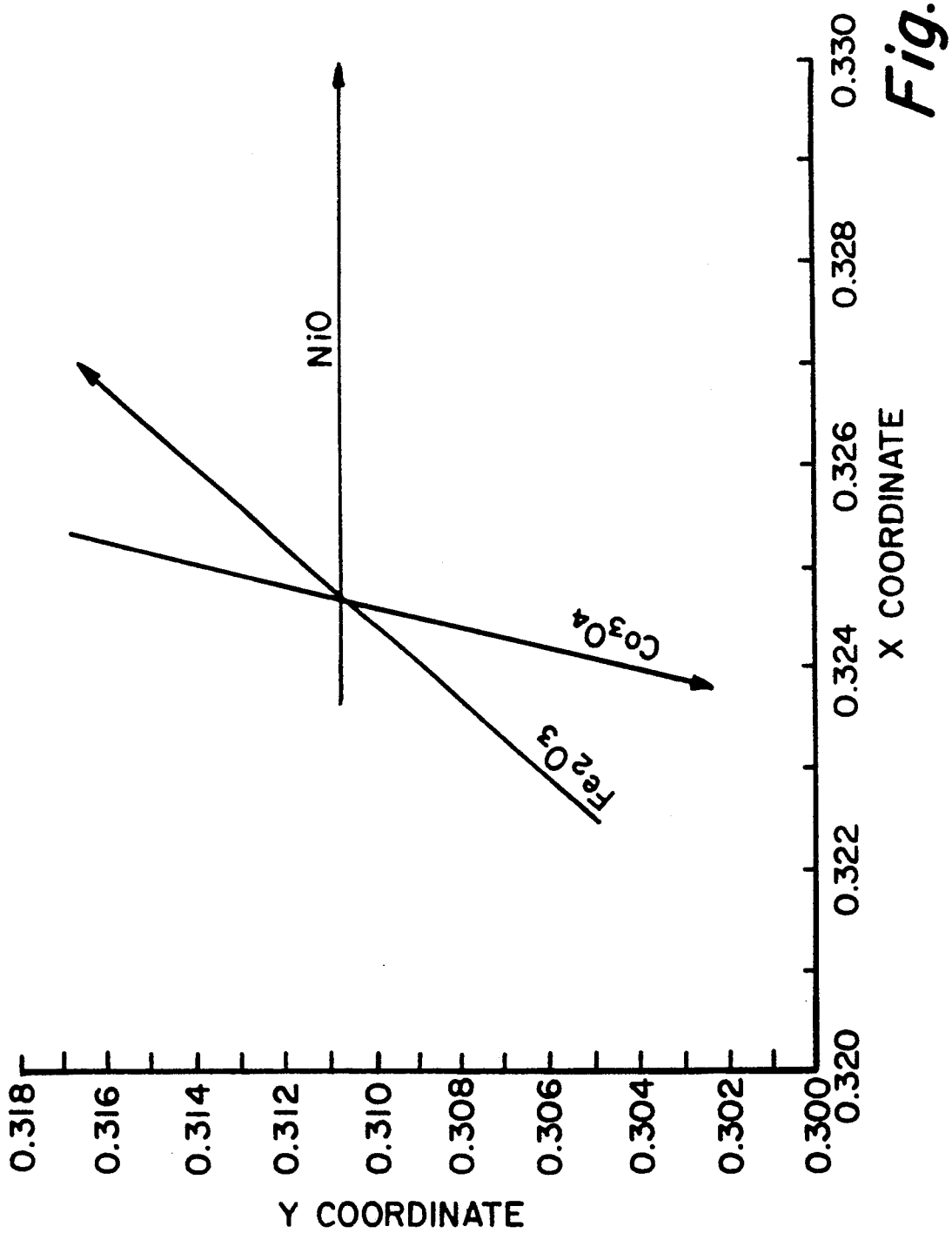
FIG. 2 is a graphical representation similar to that of FIG. 1, but showing, by vectors, the trends resulting from increasing individual colorant contents in accordance with the invention.

It will be observed that composition trends become apparent as might be expected from the vectors shown in FIG. 2. Thus, at a low $Fe_2O_3$ level, a high NiO level and low $Co_3O_4$ level are required. Likewise, a high $Fe_2O_3$ level couples with a high $Co_3O_4$ level and low NiO level. However, at least some NiO is required as shown by Examples 34–36.

It will also be observed that, because of the sloping nature of rectangle BEFGB, absolute ranges for all operative colorant combinations cannot be established. For example, the $Co_3O_4$ and NiO contents of Examples 23 and 24 (140 and 50 ppm and 140 and 90 ppm, respectively) are satisfactory at 910 ppm $Fe_2O_3$. However, the same levels are not satisfactory at 680 ppm $Fe_2O_3$ as shown by Examples 30 and 31 in TABLE II.

We claim:
1. A transparent glass-ceramic having a beta-quartz solid solution as its primary crystal phase, containing an amount of $TiO_2$ effective as a nucleating agent up to about 6%, and having a color package composed of 50 to 150 ppm $Co_3O_4$, 50 to 250 ppm NiO and 400 to 1000 ppm $Fe_2O_3$, thereby providing a burgundy color.

2. A transparent glass-ceramic in accordance with claim 1 having chromaticity coordinates (Illuminant C) in the ranges of
x = 0.3220 to 0.3410
y = 0.2990 to 0.3220
Cap Y = 50 to 70

3. A transparent glass-ceramic in accordance with claim 2 wherein the chromaticity coordinates fall within the rectangle BEFGB of FIG. 1 in the drawing.

4. A transparent glass-ceramic in accordance with claim 1 having chromaticity coordinates (Illuminant C) in the ranges of
x = 0.3230 to 0.3370
y = 0.2990 to 0.3150
Cap Y = 55 to 65

5. A transparent glass-ceramic in accordance with claim 4 wherein the chromaticity coordinates fall within the rectangle ABCDA of FIG. 1 in the drawing.

6. A transparent glass-ceramic in accordance with claim 1 wherein the color package consists of about 100 ppm $Co_3O_4$, 200 ppm NiO and 650 ppm $Fe_2O_3$.

7. An article of cookware composed of a transparent glass-ceramic having as its primary crystal phase a beta-quartz solid solution, containing an amount of $TiO_2$ effective as a nucleating agent up to about 6%, and having a color package composed of 50–150 ppm $Co_3O_4$, 50–250 ppm NiO and 400–1000 ppm $Fe_2O_3$, thereby providing a burgundy color.

8. An article of cookware in accordance with claim 7 having chromaticity coordinates (Illuminant C) in the ranges of
x = 0.3220 to 0.3410
y = 0.2990 to 0.3220
Cap Y = 50 to 70

9. An article of cookware in accordance with claim 8 wherein the chromaticity coordinates fall within the rectangle BEFGB of FIG. 1 in the drawing.

10. An article of cookware in accordance with claim 7 having chromaticity coordinates (Illuminant C) in the ranges of
x = 0.3230 to 0.3370
y = 0.2990 to 0.3150
Cap Y = 55 to 65

11. An article of cookware in accordance with claim 10 wherein the chromaticity coordinates fall within the rectangle ABCDA of FIG. 1 in the drawing.

12. An article of cookware in accordance with claim 7 wherein the color package is composed of about 100 ppm $Co_3O_4$, about 200 ppm NiO and about 650 ppm $Fe_2O_3$.

* * * * *